United States Patent
Toom

(10) Patent No.: US 6,775,914 B2
(45) Date of Patent: Aug. 17, 2004

(54) SURFACE PROFILING APPARATUS

(76) Inventor: Paul Toom, 300 Murphy Drive, Delta British Columbia (CA), V4M 3P2

( * ) Notice: Subject to any disclaimer, the term of this patent is extended or adjusted under 35 U.S.C. 154(b) by 0 days.

(21) Appl. No.: 10/313,517

(22) Filed: Dec. 5, 2002

(65) Prior Publication Data

US 2004/0055171 A1 Mar. 25, 2004

(30) Foreign Application Priority Data

Sep. 25, 2002 (CA) .............................................. 2405133

(51) Int. Cl.[7] .............................................. G01B 5/25
(52) U.S. Cl. .......................................... 33/533; 33/775
(58) Field of Search ........................ 33/533, 772, 773, 33/774, 775, 779, 780, 781, 782

(56) References Cited

U.S. PATENT DOCUMENTS

| 2,045,563 | A |   | 6/1936 | Benson |  |
|---|---|---|---|---|---|
| 2,557,450 | A | * | 6/1951 | Mentzel | ....................... 33/772 |
| 3,026,164 | A |   | 3/1962 | Lancerini |  |
| 3,056,209 | A |   | 10/1962 | Oliver |  |
| 3,875,666 | A |   | 4/1975 | Cune |  |
| 3,882,607 | A |   | 5/1975 | Plasser et al. |  |
| 4,858,329 | A | * | 8/1989 | Manor | .......................... 33/775 |
| 5,107,598 | A |   | 4/1992 | Woznow et al. | ............... 33/521 |
| 5,174,038 | A | * | 12/1992 | Neyens et al. | ................. 33/521 |
| 5,535,143 | A |   | 7/1996 | Face |  |
| 6,035,542 | A |   | 3/2000 | Woznow et al. | ............... 33/533 |
| 6,618,954 | B2 | * | 9/2003 | Kumazawa et al. | ........... 33/533 |

FOREIGN PATENT DOCUMENTS

JP 1-187410 * 7/1989 ............ G01C/7/04

OTHER PUBLICATIONS

Website: http://www.flatfloors.com/roadflat RoadPro Road Bridge Roughness/Smoothness Toster—Ytterberg Scientific Inc.

* cited by examiner

Primary Examiner—Christopher W. Fulton
(74) Attorney, Agent, or Firm—Glenn Patent Group; Michael A. Glenn

(57) ABSTRACT

A surface profiler comprises at least one mass resiliently supported in relation to the frame of the profiler to exert a downward force opposing upward movement of the frame when the wheels pass over an obstacle. Two such masses may be constrained for substantially vertical movement by tie rods extending from pivoting suspension bars secured on distal portions of the frame. A pivoting bracket optionally connects to a handle or to a motor drive unit for propelling the apparatus. The bracket is pivoted about the center point of a line joining the centers of the wheel axles to avoid any torque on the apparatus as a result of operator manipulation.

35 Claims, 6 Drawing Sheets

SURFACE PROFILING APPARATUS

FIELD OF THE INVENTION

The invention relates generally to surveying instruments. More specifically the invention relates to a rolling, contact-based, surface profiler for determining the contour and characteristics of a surface. Such apparatus are useful in a number of industries and applications, most notably in the construction and maintenance of roads, aviation runways, bridges, buildings and other structures.

BACKGROUND OF THE INVENTION

Surface profiling methods include either non-contact methods using optical (e.g. laser) and ultrasonic transducers, or contact-based methods using ground-engaging pads or wheels.

Contact-based profilers are generally either of the "walking" or the rolling type. So-called "walking" profilers include those having spaced ground-engaging pads that are alternately brought into engagement with the surface across the distance to be measured. However, the majority of contact-based profilers are of the rolling type. Rolling profilers travel on wheels over the surface to be profiled. They may be manually propelled by a walking operator, or driven or towed by a vehicle.

Rolling profilers may in turn generally be characterized as being of the type where the profiler's supporting wheels are not connected to the transducer (typically with an inclinometer or a pendulum measuring the inclination of the entire profiler's frame) or of the type having separate marker or sensing wheels that do not support the profiler but are connected to a transducer for direct sensing of the position of the marker wheel in relation to the supporting wheels. A relatively common prior art approach for rolling profiling apparatus of the latter type is to provide load bearing wheels at the front and rear ends of a frame and ground-engaging sensing means mounted between the load bearing wheels. Such apparatus is exemplified by U.S. Pat. No. 5,535,143 to Face.

In surface profiling, a surface contour or "profile" is acquired by making measurements at constant distance intervals of the elevation along the surface, relative to a starting elevation. Sampling of elevation in this manner produces a mathematical series of elevations, which collectively represent the physical surface. The elevation series can be used for a number of purposes relating to construction or ongoing management of the surface.

Various mathematical algorithms can be applied to the series to calculate indices that are representative of the roughness or smoothness of the surface. The "roughness" relates to the discomfort that would be experienced by a passenger riding in a real or simulated vehicle that rolls over the surface. One of these indices, by way of example, is the International Roughness Index (IRI), that models the suspension of a nominal quarter of an automobile that is rolled over the surface within a computer model. The IRI algorithm computes the total travel of the quarter car's suspension per unit of distance traveled while rolling over the subject profile—the greater the travel, the higher the IRI value or roughness.

IRI is increasingly being used for surface construction contract management. The quality of a newly constructed surface is compared to its contractual end product specification to determine if the finished or "end product" surface is compliant with the specification. Construction contracts can be managed using surface profilers with contract bonuses and penalties payable depending on profile test results. IRI is coming into use as the preferred index being used to determine profile quality. It should be apparent that instruments used to acquire the elevation series representing the actual surface profile that are used as input for calculation of the IRI must therefore have high accuracy and repeatability.

IRI is also being used for management of large-scale networks of roads within the jurisdictions of state departments of transport and highways, where non-contact surface profilers capable of collecting data at highway speeds are commonly being used. These are typically inertial profilers that measure elevation with reference to an inertial reference contained within a computer model. Due to their inherent limitations, such inertial profilers must be calibrated or verified against a benchmark reference or a more accurate profiling instrument to validate the data they acquire.

As the accuracy of any rolling contact-based profiler depends on maintaining continuous contact between the profiler and the surface to be profiled, the more accurate rolling profilers tend to be those that are manually operated at relatively low speeds so that the characteristics of the surface can be fully captured. While the accuracy of such devices is generally higher, the rate of data collection using contact devices has generally been too slow.

Prior art rolling devices, travelling at speeds approaching normal human walking speed of about 2.5 mile per hour, begin to lose contact with the surface to be profiled, particularly when travelling over holes or bumps. As a result, the operator must restrict the speed of the profiler to avoid bouncing it and such profilers require substantial time to collect data, requiring the operator to remain in the field for extended periods. This in turn subjects the operator to risks from the traffic in the area being surveyed. In addition, despite care being taken by the operator to avoid bounce, the accuracy of some of these devices is still less than ideal.

It is therefore an object of the present invention to provide a rolling profiler having improved accuracy and increased speed of data acquisition. More specifically, it is an object of the present invention to provide such improved accuracy and increased speed in a rolling profiler wherein the transducer measures the inclination of the entire profiler frame.

It is known to provide, in a rolling profiler, a suspension system between load bearing wheels and the frame of the profiler, which supports inclinometer transducer means, in a manner analogous to a conventional vehicle suspension. Such a system is disclosed for example in U.S. Pat. No. 3,882,607 to Plasser et al. in a rail profiling car. The effect of such a suspension is to smooth out the ride of the frame. However, where the transducer measures the inclination of the frame, this results in an averaging of the profile data and detracts from the accuracy of the profile.

It is desirable to provide a means for maintaining the supporting wheels of the profiler in continuous contact with the surface but to do so by means of a bias system that nonetheless allows the frame to fully track the vertical displacement of the wheels caused by discontinuities in the surface being profiled.

It is further known to provide a handle to allow an operator to propel a manual rolling profiler. Such handles are disclosed in U.S. Pat. No. 3,026,164 to Lancerini and U.S. Pat. No. 5,107,598 to Woznow et al. It will be noted that such prior art handles are typically either rigidly mounted at the rear end of the profilers or are pivoted high above the wheel axles. However, such arrangements subject the frame of the profiler to an unbalanced vertical force as a result of the propulsion and manipulation (pushing and pulling) by the operator of the handle. This unbalanced vertical force on the frame skews the derived profile data.

It is therefore a further object of the present invention to provide a handle arrangement that minimizes the imbalance imposed on the frame as a result of manipulation by the operator.

With the higher accuracy and higher speed of operation contemplated by the present invention, it is possible to operate the profiler at speeds greater than the normal walking speed of an operator. It is therefore desirable to provide means for converting the profiler from a manual mode to a driven mode.

The foregoing and other objects of the invention will be appreciated by reference to the summary and detailed description of the preferred embodiment that follow.

SUMMARY OF THE INVENTION

The surface profiling apparatus to which the invention relates comprises a frame, wheels and one or more devices for measuring inclination of the frame. Such devices are preferably inclinometers.

In one embodiment of the apparatus, the frame is supported by front and rear load bearing wheels mounted on the frame.

According to one aspect of the invention, at least one mass is resiliently supported by the frame (not between the frame and the wheels) to provide a downwardly biasing force on the frame. The resilient support for the masses is sometimes referred to herein and in the claims as a suspension and the masses in such arrangement are sometimes referred to as "floating masses". The invention acts to maintain the wheels in close contact with the surface to be profiled, while eliminating relative vertical displacement of the wheels in relation to the frame. Preferably the mass is larger than the combined mass of the frame and wheels and consists of a battery.

In a more specific aspect of the invention, one mass is associated with a front portion of the frame and another mass is associated with a rear portion of the frame.

The tracking of the wheels and frame supporting the inclinometer(s) is improved by the introduction of such resiliently supported masses bearing down on the front and rear frame portion, the masses being preferably suspended above the wheels and preferably constrained for movement in a direction that is substantially perpendicular to the longitudinal axis of the frame. More specifically the movement is preferably normal to the general plane of the surface being profiled, i.e. vertical in relation to the frame of the apparatus.

The masses provide a downward force and inertia that opposes vertical motion of the frame. Such vertical motion may result from the wheel(s) passing over bumps in the surface to be profiled and would tend to thrust upward the wheel and consequently the frame. Absent the mass system of the invention, this would normally result in separation of the wheel from the surface to be profiled and error in the data acquired by the inclinometer(s) mounted on the frame.

The masses are resiliently, rather than rigidly, supported, for example as by a spring. The compliance of the suspension/support allows initial relative upward movement of the frame in relation to the masses. The suspension's resiliency then acts to apply a downward force to the frame following the initial upward displacement.

A suspension having multiple degrees of freedom may be subject to troublesome oscillation in the lateral plane that would skew the profile data. Consequently, the invention substantially constrains the direction of movement of the masses to the vertical plane (in relation to the frame).

Sustained underdamped oscillation in the vertical plane is also undesirable as it may thwart the objective of maintaining close contact between the wheels and the surface to be profiled. Accordingly, in one aspect the invention contemplates the use of dampers associated with the suspension.

The accuracy of the surface profiling process may be improved by eliminating or reducing instrument bias arising from both mechanical sources and sensor sources, i.e. reducing the tendency for the surface profile curve shape, produced from data acquired by the profiler, to deviate or drift from the true profile curve shape. Such bias would be apparent from a tendency of the inclinometer(s) to read higher or lower than the correct value for a sustained number of samples. IRI is very sensitive to bias error in profile data so such error is very undesirable.

In one of its aspects, the present invention reduces mechanical bias by providing a pivoting coupling for the propulsion means to the profiler frame at a point substantially central between the front and rear wheels, that is, at the center point of a line joining the centers of the wheel axles. Use of either a fixed (non-pivoting) coupling or selection of a point of pivoting coupling of the propulsion means at any other point on the frame would result in a torquing of the frame about the lateral axis, with respect to the direction of travel. This torque would be apparent from analysis of force vectors acting on the frame which would resolve as an unbalanced moment about the center of the profiler's frame. The said torque would specifically result from thrust on the propulsion handle in combination with frictional forces associated with the rotation of wheels on their bearings and rolling friction between the wheels and the surface to be profiled. The said torque would result in unbalanced vertical loading on the two axles and, given the compliance of the rubber wheels, would consequently result in a tilt of the instrument chassis, which would in turn be detected by the inclinometer and result in said bias error.

In a further aspect, the present invention reduces sensor bias error by the use of two or more (any even number) of identical inclinometer sensors attached to the frame of the profiler. The odd and even numbered sensors are oriented in reverse with respect to each other along the axis of travel, such that odd numbered sensors are oriented 180 degrees with respect to the even sensors. The outputs of the odd and even numbered inclinometers are subtracted from each other with the result that the desired signal is averaged and unwanted drift signal is largely cancelled out. This is possible because inclinometers and other sensors manufactured with identical design and manufacturing processes will typically have drift characteristics that are usually fairly closely matched both in polarity and magnitude.

In another aspect of the invention, the first floating mass is provided over the front wheel or wheels and the second floating mass is provided over the rear wheel or wheels.

In yet another aspect of the invention, the movement of each floating mass is constrained to be substantially in the vertical plane by a longitudinally rigid member attached for rotation about a point on the end of the frame opposite the wheel over which the mass is located.

In a more detailed aspect of the invention, each mass is secured by means of at least one tie rod extending from the mass to the opposite end of the frame and secured to a pivoting suspension bar.

In yet a further aspect of the invention, the floating masses are supported by means of springs between each floating mass and a portion of the frame underlying the respective masses. Advantageously, dampers are associated with the suspension supports for the masses.

In yet another aspect, the invention provides a pivoting handle and hitch arrangement allowing the handle to be hitched to a motorized drive unit for remotely propelling the profiler.

The present invention, given its high accuracy and repeatability, while finding uses in several industries and for many purposes, will be of particular value in both the contract management of new surface construction and as a reference standard for certification of other instruments.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

The preferred embodiment of the invention will be described by reference to the drawings thereof in which.

DETAIL DESCRIPTION OF THE PREFERRED EMBODIMENT

Figure 1:
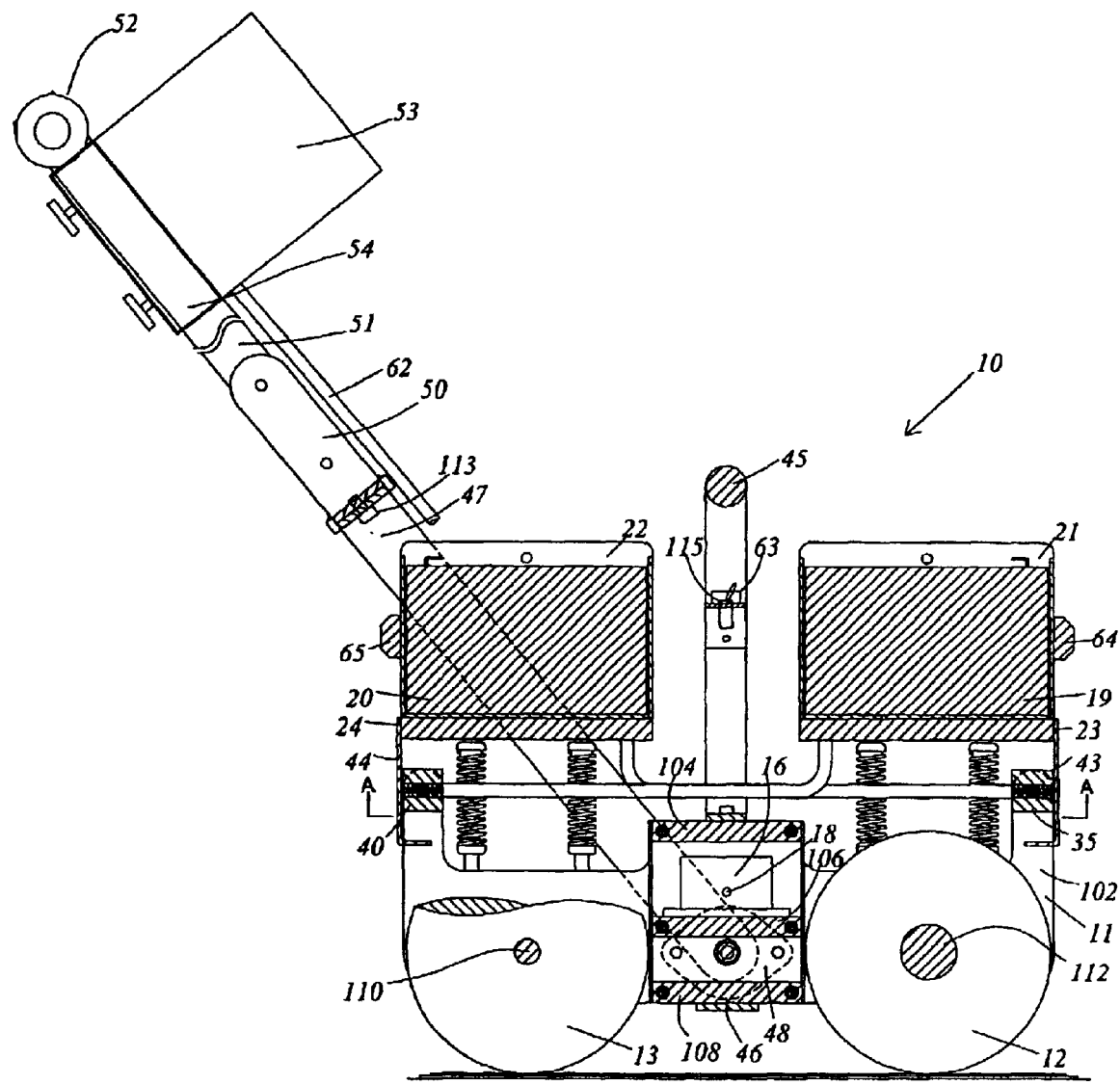
FIG. 1 is a side elevation of the profiler according to the preferred embodiment, with one of the wheels being cut away to show the spring and damper assembly associated with one of the masses.
Figure 2:
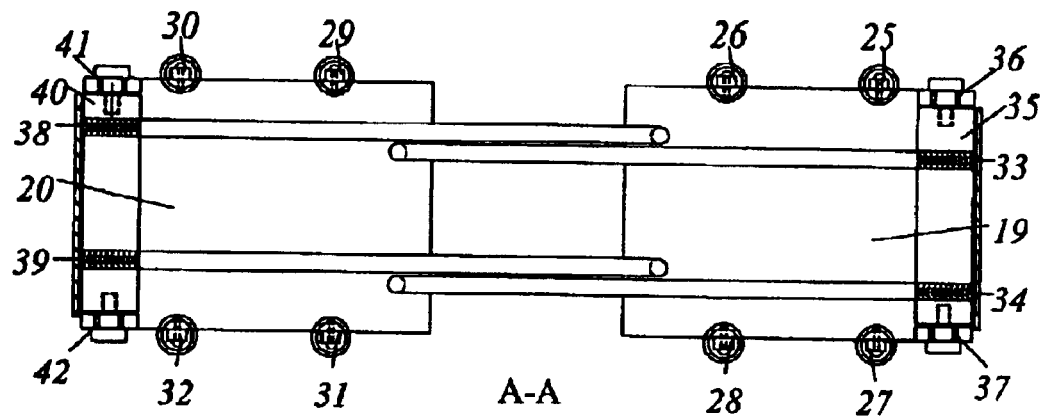
FIG. 2 is a sectional view of the profiler taken along line A—A of FIG. 1.
Figure 3:
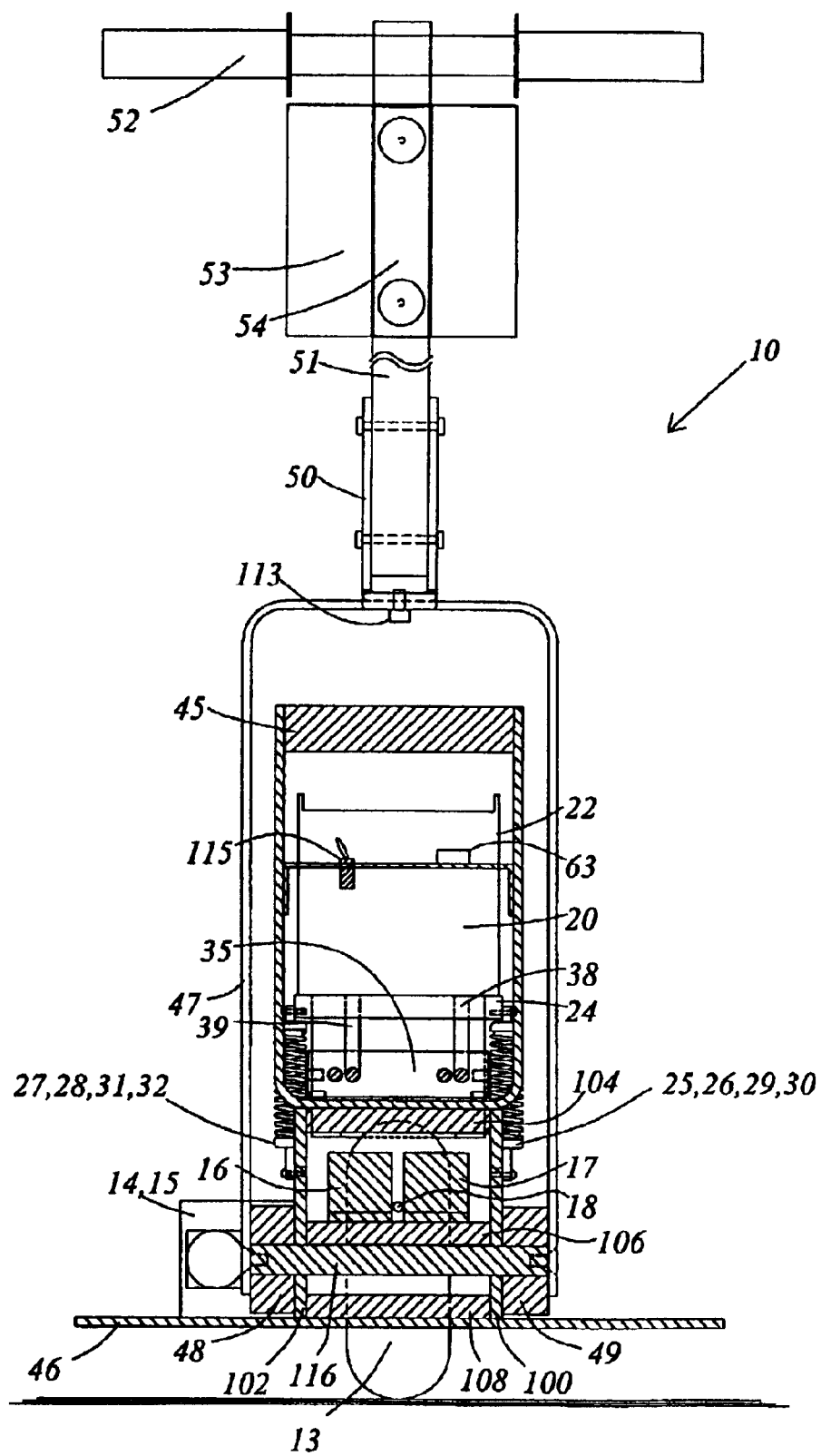
FIG. 3 is a vertical sectional view taken along the center of the profiler looking from the rear.
Figure 4:
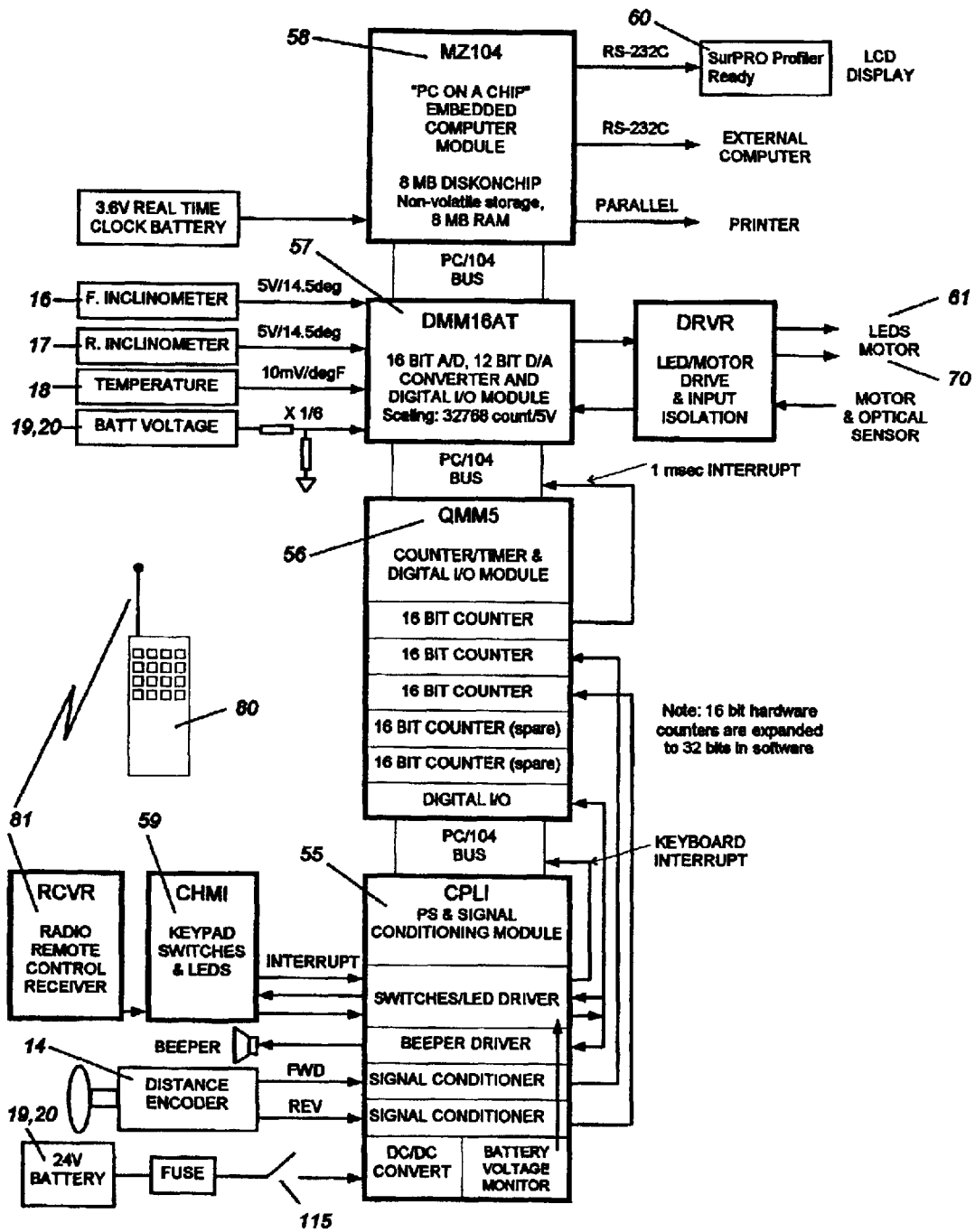
FIG. 4 is a block diagram of the control components of the profiler.
Figure 5:
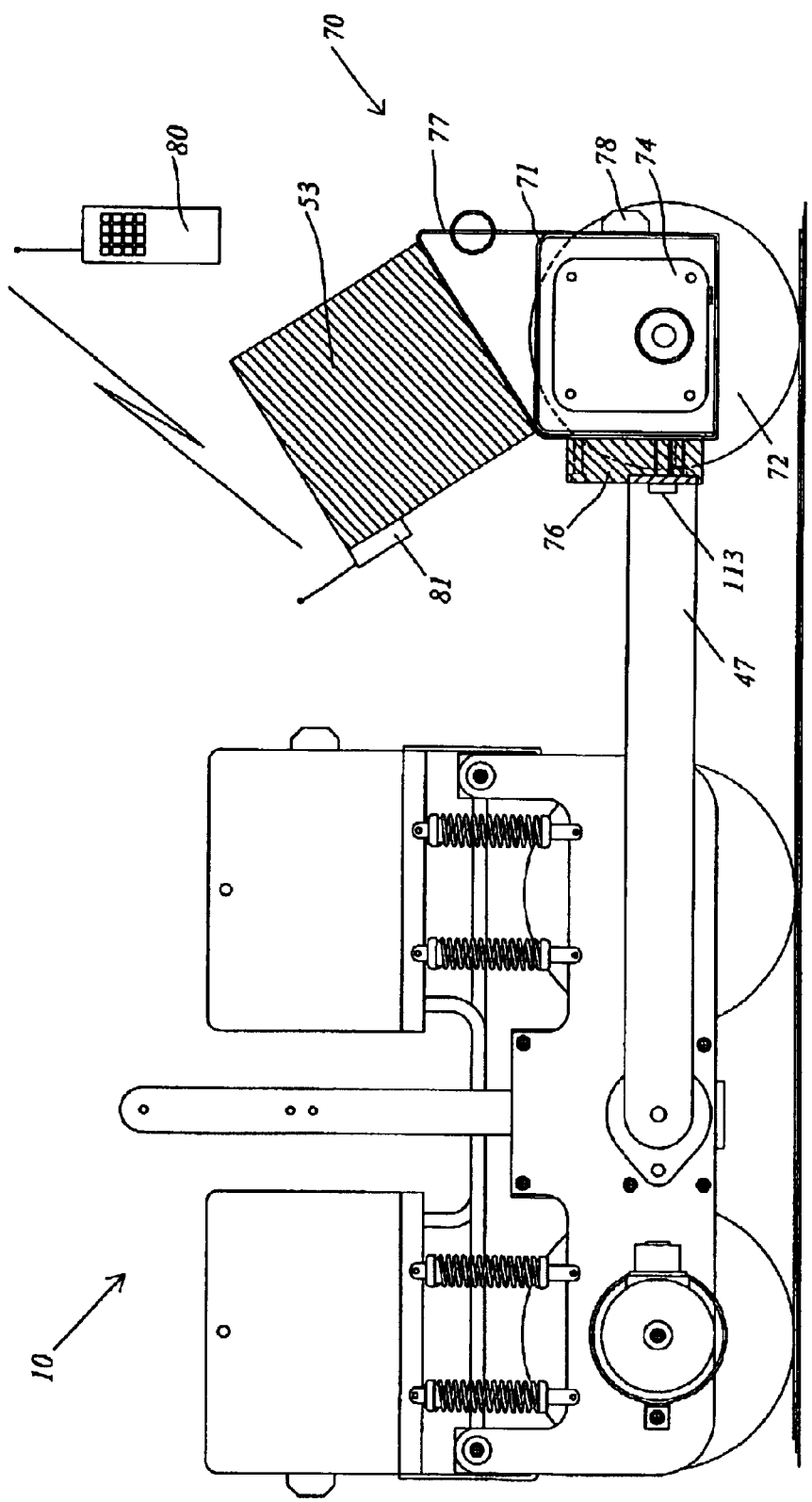
FIG. 5 is a side elevation of the profiler according to the motorized drive embodiment of the invention with the motor drive assembly seen in vertical section, viewed from the side; and, FIG. 6 is a vertical sectional view of the motor drive assembly, viewed from the rear.
Figure 6:
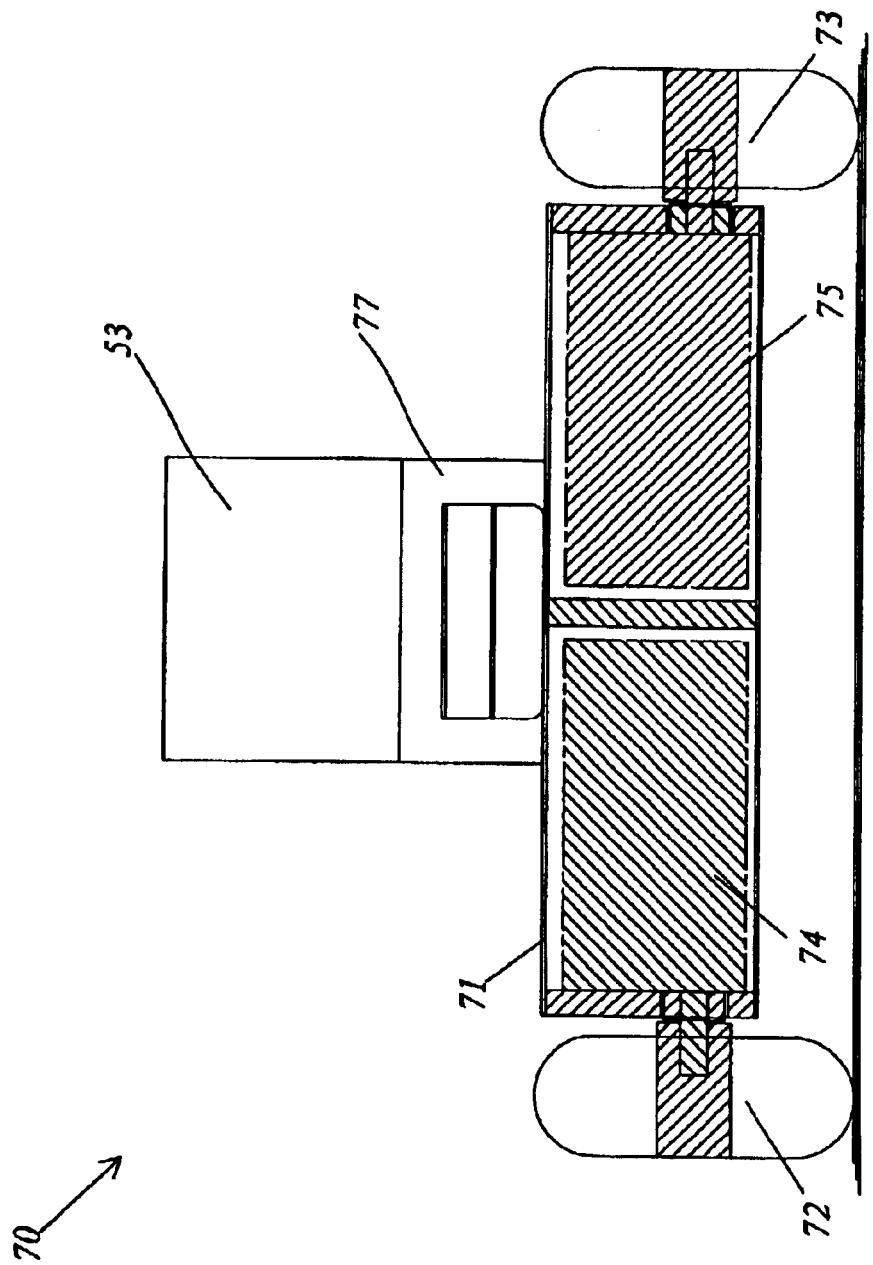

Referring to FIGS. 1 to 3, a surface profiler 10 according to the invention comprises a frame 11 which is supported by a forward support wheel 12 and a rearward support wheel 13. Frame 11 comprises right frame section 100 and left frame section 102 joined by cross-members 104, 106, 108.

Wheels 12,13 are spaced apart longitudinally on the frame 11 for travel along the same line. They are mounted for rotation on axles 110, 112 that are supported on frame 11. In the preferred embodiment, the distance between the front and rear axles is 0.25 meters. The frame and wheel hubs are conveniently of aluminum and the wheel tires of solid natural rubber. Aluminum is chosen to minimize the mass of the wheels relative to the floating masses. Solid natural rubber is chosen for durability, to keep wheel mass low and to provide compliance between the frame and the surface to be profiled, i.e. to average out micro-texture, and to reduce coupling of vibration from the wheels to the frame and instruments of the profiler.

A distance measuring unit, in the form of an optical encoder 14, is attached to the forward end of the frame 11 and to the front axle 112. Front axle 112 translates its rotational motion via a direct coupling to the encoder 14 for generating digital pulses of the distance traveled. A shield 15 is provided for protecting the encoder 14 against physical damage.

Inclinometers are provided in the center of the frame 11. An even number of inclinometers, conveniently two (16 and 17), are installed with the odd and even numbered inclinometers installed in reverse orientation with respect to one another, and with their sensitive measuring axes in the longitudinal direction of the profiler, i.e. along the path of travel. Inclinometers measure the orientation of the frame with respect to the horizontal position. Odd and even numbered inclinometers read out with opposite mathematical sign, odd being positive and even being negative.

A freely suspended or floating mass 19 is provided above the front wheel 12. Springs and associated piston dampers 25, 26, 27, 28 extend between mass 19 and a portion of the frame 11 above which the mass is located. Similarly a floating mass 20 is provided above rear wheel 13 and springs and associated piston dampers 29, 30, 31, 32 extend between mass 20 and the underlying frame.

Stainless steel tie rods 33, 34 each have one end attached to a pivoting suspension bar 35 located at the forward extremity of the frame 11. The opposite end of each tie rod is secured to base plate 24 that supports the mass 20 suspended over rear wheel 13 at the opposite end of the frame. Similarly tie rods 38, 39 each have one end attached to a pivoting suspension bar 40 located at the rearward extremity of the frame 11. The opposite end of each tie rod is secured to mass 19 (by securement to base plate 23 that supports the mass) suspended over front wheel 12 at the opposite end of the frame. The pivoting suspension bars 35, 40 are secured to the frame 11 by means of sintered bronze pivot sleeve bearings 36, 37 and 41, 42 respectively. The arrangement of the floating masses 19, 20 and stainless steel tie rods 33, 34, 38, 39 and pivoting suspension bars 35, 40 provides for interleaving of steel tie rods 33, 34, 38, 39 and freedom from mutual interference of all parts such that the motion of front and rear suspensions is fully independent one from the other. In this way, if either wheels passes over a bump or a hole, the opposite wheel will be largely unaffected by the reaction of the suspension components at the end of the frame passing over the bump or hole. This arrangement is intended to improve the tracking of the wheels over the surface to be profiled and to consequently improve the accuracy of the profile data acquired by the instrument.

The tie rod arrangement described above effectively constrains movement of the masses in a direction that is substantially perpendicular to the longitudinal axis (front to back) of the frame. Preferably the direction of movement is vertical in relation to the frame of the apparatus, i.e. normal to the general plane of the surface being profiled. Rather than using tie rods, this could also be accomplished by means of a vertical guide (for example lineal bearings) associated with each mass.

In the preferred embodiment, floating masses 19, 20 consist of sealed gelled electrolyte batteries contained in aluminum cases 21, 22 supported on sturdy aluminum bases 23, 24. The batteries are used to operate the control circuitry, safety marker lights and motor drive used in the profiler.

Springs and piston dampers 25, 26, 27, 28, 29 30, 31 and 32 are steel springs with coaxially mounted valved hydraulic pistons and cylinders filled with silicone oil, where spring force rates, oil viscosity and valve rates have been chosen to optimally damp the motion of the floating masses 19, 20 in response to shocks coupled to the frame 11 from front and rear wheels 12, 13.

Upward travel of the floating masses 19, 20 is limited by suspension travel limiters 43, 44 mounted at each extremity of the frame 11 so as to minimize the potential damage to the springs and dampers. Upward travel of the floating masses 19, 20 is limited by contact between limiters 43, 44 and the lower surfaces of pivoting suspension bars 35, 40. Downward travel of the floating masses 19, 20 is limited by contact between battery base plates 23, 24 and upper surfaces of pivoting suspension bars 35, 40.

The inventor has found that the invention provides much improved accuracy and allows the profiler to be operated at higher speeds than profilers of the prior art.

A handle 45 for lifting the profiler 10 is provided. A switch and electrical connector bracket is attached to handle 45. Means to stabilize the profiler 10 when it is not being operated is provided by anti-tip-over stand 46 mounted on the bottom of the frame 11, which enables the unit to lean to either side laterally with respect to the profiling path without falling over.

A U-shaped propulsion bracket 47 is attached to frame 11 using ball bearings 48, 49 and a propulsion bracket axle 116 that passes through the bearings. Propulsion bracket 47, using connector 50 may optionally be coupled either to a pivoting, removable extension handle 51 or to a motor drive assembly as discussed in more detail below. Propulsion bracket 47, with or without extension handle 51 attached, may be pivoted over the top of the profiler 10 to allow reversal of the direction of propulsion without the need to lift and turn around the profiler 10 (i.e. by rotating the profiler 180 degrees about the vertical axis). The profiler 10 is intended to be symmetrical in arrangement and reversible in direction of travel. A control cabinet 53 is secured to the removable extension handle 51 using a sliding bracket 54. When the propulsion bracket 47 is pivoted over the top of profiler 10, the control cabinet 53 must be rotated around the handle 51 to restore correct orientation for viewing LED and LCD displays and operating controls. Extension handle 51 is inserted into connector 50 and secured by bolts. Extension handle 51 may be detached by removing both securing bolts, or folded by removing only one of the securing bolts, for ease and convenience of storage or shipping. U-shaped propulsion bracket 47 and connector 50 are conveniently of stainless steel and the removable or folding extension handle 51 of aluminum. Connector 50 is removably attached to propulsion bracket 47 by a single bolt 113.

Control cabinet 53 contains the circuitry required to acquire signals from inclinometers 16,17, temperature sensor 18 and distance measuring optical encoder 14. It contains power supply and signal conditioning module 55, counter/timer and digital input/output module 56, 16 bit analog to digital converter, 12 bit digital to analog converter and digital I/O module 57, computer and non-volatile memory 58. A keyboard 59, liquid crystal (LCD) alphanumeric display 60 and light emitting diode (LED) displays 61 are also provided for control by the operator and provision of information. Cable harness 62 interconnects all of the instruments together with the control cabinet 53, the battery masses 19, 20, power switch 115, charger connector 63, and safety marker lights 64, 65 which are intended to improve visibility of the profiler. These lights are conveniently high intensity LEDs.

Data acquisition is controlled by the computer 58 in the control cabinet 53 using keys on the keyboard 59 and LCD 60 and LED 61 displays. Under control of the computer 58 the distance is measured using distance optical encoder 14 which sends digital pulses representative of the distance traveled to counter timer and digital I/O module 56, which triggers acquisition (i.e. digital conversion and storage) of analog voltages at appropriate distances. The analog voltages from the inclinometers 16, 17, temperature sensor 18, and battery masses 19, 20 are acquired by the 16 bit analog to digital converter.

A motor drive 70 is optionally provided to tow or pull the profiler 10. It reduces operator safety risk and fatigue by enabling the operator to control the profiler 10 at a safe distance from traffic or ride in a vehicle while the data is being collected. Connector 50 is detached from propulsion bracket 47 and the horizontal cross bar of bracket 47 is attached to a motor drive 70 using hitch 76 (rather than to the removable extension handle 51 which is used for manual propulsion). Hitch 76 consists of a horizontal notch adapted to snugly receive the horizontal cross bar of bracket 47. The corresponding horizontal surfaces forming part of the notch and the cross bar abut to prevent pivoting of the apparatus relative to the drive 70 along the longitudinal axis of the overall assembly.

Motor drive 70, as viewed from the rear with reference to the longitudinal direction of travel, consists of a chassis 71 supported by left ground engaging wheel 72 and right ground engaging wheel 73. Lateral spacing of wheels 72, 73 provides lateral stability for the profiler. Such lateral stability is largely provided by the operator when the profiler 10 is being propelled manually. Wheel 72 is directly coupled to gear motor 74 and wheel 73 is directly coupled to gear motor 75. Each of gear motors 74, 75 consists of a brushless 24 volt direct current motor, gear reducer and an electronic speed control. The 24 volts are supplied by 12-volt battery masses 19 and 20 connected in series. Speed setting reference voltages for gear motors 74, 75 are provided by digital to analog voltage converter section of 57 under control from computer 58. The gear motors 74, 75 are also used to steer the motor drive 70 and hence the profiler 10 by setting the speed of gear motor 74 differently from that of gear motor 75.

When the motor drive 70 is used to pull the profiler 10, the control cabinet 53 is attached to a control cabinet mounting bracket 77 on the top of motor drive 70. A lifting handle is provided as part of control cabinet mounting bracket 77 in the form of a cutout hole with the sharp metal edge covered by a steel or rubber tube. Safety marker lights (78) improve visibility of the motor drive. These lights are conveniently high intensity LEDs. Motor drive 70 is controlled by radio remote control 80 and radio remote control receiver 81, which receives signals from remote control transmitter 80 and provides control signals to computer 58, which in turn sends start, stop, brake and differential speed signal commands to the gear motors 74, 75 to set the speed of, and to steer, the motor drive 70 and profiler 10. When the motor drive 70 is used to propel the profiler, usually by towing the profiler 10 behind it, the normal direction of travel of the profiler 10 may be the reverse of the normal direction of travel when the profiler 10 is propelled manually using removable extension handle 51. The profiler 10 is intended to be reversible in direction of travel. Computer 58 is able to make adjustments for direction of travel by detecting electrical signals that are present only when motor drive 70 is connected.

The above description has been intended to illustrate the preferred embodiments of the invention. It will be appreciated that modifications and adaptations to such embodiments may be practised without departing from the scope of the invention, such scope being most properly defined by reference to this specification as a whole and to the following claims.

What is claimed is:

1. Surface profiling apparatus comprising a frame, wheels supporting said frame, inclination measuring apparatus and at least one mass resiliently supported above said frame to provide a downwardly biasing force on said frame.

2. The surface profiling apparatus of claim 1 wherein said at least one resiliently supported mass comprises a first and second such resiliently supported masses, and wherein said wheels comprise a front wheel and a rear wheel, said first mass overlying a said front wheel, said front wheel being mounted to support a front portion of said frame and said second mass overlying said rear wheel, said rear wheel being mounted to support a rear portion of said frame.

3. The surface profiling apparatus of claim 2 further comprising a first resilient support secured to said front portion for resiliently supporting said first resiliently supported mass in overlying relationship to said front wheel and a second resilient support secured to said rear portion for resiliently supporting said second resiliently supported mass in overlying relationship to said rear wheel.

4. The surface profiling apparatus of claim 3, said frame having a longitudinal axis, and each of said masses being constrained for movement substantially perpendicular to said longitudinal axis.

5. The surface profiling apparatus of claim 3 further comprising at least a first rod one portion of which is rotatably secured to said rear portion and another portion of which is secured to said first mass, and a second rod one portion of which is rotatably secured to said front portion and another portion of which is secured to said second mass.

6. The surface profiling apparatus of claim 3 further comprising a first pair of rods secured to said rear portion and a second pair of generally elongated rods secured to said front portion.

7. The surface profiling apparatus of claim 6 wherein said elongated rods of said first pair are laterally interleaved with the elongated rods of said second paid.

8. The surface profiling apparatus of claim 7 wherein said rods are mounted on pivoting members pivotally secured to said frame.

9. The surface profiling apparatus of claim 3 or 8 wherein each of said masses is a battery.

10. The apparatus of claim 3 or 8 wherein each of said masses is larger than the combined mass of said frame and said wheels.

11. Surface profiling apparatus, comprising:
    a frame having a front portion and a rear portion;
    at least one front wheel supporting said front portion;
    at least one rear wheel supporting said rear portion;
    inclination measuring apparatus mounted on said frame for measuring the inclination of said frame;
    at least one mass;
    at least one resilient support extending from said frame and supporting said mass; and,
    said mass exerting, through said support, a force biasing said frame downward.

12. The surface profiling apparatus of claim 11 wherein said frame has a longitudinal axis extending from the front to the back of the apparatus and wherein said at least one mass is constrained for movement substantially in a plane perpendicular to said longitudinal axis.

13. The apparatus of claim 4 or claim 12 said movement is substantially normal in relation to the general plane of the surface being profiled.

14. The surface profiling apparatus of claim 11 wherein said at least one mass comprises a first and a second masses, said at least one resilient support comprises at least one first support and at least one second support and wherein:
    said first support extends from said front portion of said frame and supports said first mass, said first mass exerting, through said first support, a force biasing said front portion downward; and,
    said second support extends from said rear portion of said frame and supports said second mass, said second mass exerting, through said second support, a force biasing said rear portion downward.

15. The surface profiling apparatus of claim 14 wherein there is substantially no vertical displacement of said front or rear wheels relative to said frame.

16. The surface profiling apparatus of claim 15 wherein said front and rear wheels are mounted on said frame in fixed relationship to one another.

17. The surface profiling apparatus of claim 16 wherein each of said first mass and said second mass overlies at least one portion of said frame.

18. The surface profiling apparatus of claim 16 further comprising at least one first member having a frame end retained on said frame and a mass end secured to said first mass, said mass end being resiliently displaceable in the vertical plane in relation to said frame end, and at least one second member having a frame end retained on said frame and a mass end secured to said second mass, said mass end of said second member being resiliently displaceable in the vertical plane in relation to said frame end of said second member.

19. The surface profiling apparatus of claim 18 wherein said frame end of said first member is retained on said front portion of said frame, said first mass overlying said rear portion of said frame, and wherein said frame end of said second member is retained on said rear portion of said frame, said second mass overlying said front portion of said frame.

20. The surface profiling apparatus of claim 19 wherein said at least one first member comprises two first rods each of which has a first end retained on said front portion of said frame and a second end secured to said first mass, said two first rods extending parallel to one another, and wherein said at least one second member comprises two second rods each of which has a first end retained on said rear portion of said frame and a second end secured to said second mass, said two second rods extending parallel to one another, one of said first rods extending between said two second rods and one of said second rods extending between said two first rods.

21. The surface profiling apparatus of claim 17 or claim 19 further comprising at least one damper between each mass and the portion of said frame underlying said each mass.

22. The surface profiling apparatus of claim 17 or claim 19 further comprising at least one damper between each mass and the portion of said frame underlying said each mass, and a travel limiter rigidly associated with each of said masses adapted to abut said frame upon a predetermined vertical displacement of said masses to thereby prevent farther vertical displacement of said masses.

23. The surface profiling apparatus of claim 11, 14 or 19 wherein each of said masses comprises a battery.

24. The surface profiling apparatus of claim 11, 14 or 19 wherein each of said masses comprises a battery mounted on a plate, said resilient support(s) being secured to respective ones of said plates.

25. The surface profiling apparatus of claim 18 further comprising a first pivoting element secured to said frame, said frame end of said first member being secured to said frame by securement to said first pivoting element, and a second pivoting element secured to said frame, said frame end of said second member being secured to said frame by securement to said second pivoting element.

26. The surface profiling apparatus of claim 25 wherein said first pivoting element is secured to said front portion of said frame, said first mass overlying said rear portion of said frame, and said second pivoting element is secured to said rear portion of said frame, said second mass overlying said front portion of said frame.

27. The apparatus of claim 11 wherein said at least one mass is larger than the combined mass of said frame and said wheels.

28. Surface profiling apparatus comprising:

a frame;

a device mounted on said frame for measuring the inclination of said frame;

at least one front wheel having an axis of rotation and supporting a front portion of said frame;

at least one rear wheel having an axis of rotation and supporting a rear portion of said frame;

said front and rear wheels being disposed for travel in the same plane; and, a handle pivotally mounted substantially at a mid-point between the axes of rotation of said front and rear wheels, said mid-point being substantially on a horizontal plane defined by said axes of rotation.

29. The surface profiling apparatus of claim 28 wherein said mid-point corresponds to the center point between front and real wheels of said apparatus.

30. The surface profiling apparatus of claim 28 further comprising:

a first mass overlying at least a portion of said frame;

a second mass overlying at least a portion of said frame;

at least one resilient first support extending from said front portion of said frame and supporting said first mass, said first mass exerting, through said first support, a force biasing said front portion downward;

at least one resilient second support extending from said rear portion of said frame and supporting said second mass, said second mass exerting, through said second support, a force biasing said rear portion downward; and, said front and rear wheels being mounted on said frame in fixed relationship to one another and there being substantially no vertical displacement of said front or rear wheels relative to said frame.

31. The surface profiling apparatus of claims 11 or 28 comprising at least two substantially identical inclinometers mounted on said frame, said at least two inclinometers being oriented at 180 degrees in relation to one another.

32. Surface profiling apparatus comprising:

a frame;

at least one front wheel supporting a front portion of said frame;

at least one rear wheel supporting a rear portion of said frame;

an elongated member pivotally mounted on said frame, adapted to removably receive a handle and being adapted to pivot to a substantially horizontal plane;

said elongated member having a frame end and an attachment end, said attachment end being adapted to be secured to a wheeled motor drive assembly.

33. A surface profiling assembly comprising:

surface profiling apparatus comprising a frame, wheels supporting said frame, a device mounted to said frame for measuring inclination of said frame and an elongated member adapted to removably receive a handle adapted for manual propulsion of said apparatus;

said elongated member having a frame end and an attachment end and being pivotally mounted to said frame so as to be pivotable to a substantially horizontal plane; and, a wheeled motor drive unit having wheels and a motor to drive said wheels, said motor drive unit being adapted to receive said attachment end for securement of said attachment end to said motor drive unit.

34. The surface profiling assembly of claim 33 wherein said attachment end comprises a horizontal surface adapted to about a corresponding horizontal surface of said drive unit upon securement of said attachment end to said drive unit, whereby to prevent relative pivoting of said elongated member and said drive unit along the longitudinal axis of said assembly.

35. The surface profiling assembly of claim 33 wherein said wheels of said drive unit are laterally spaced.

* * * * *